(12) United States Patent
Nair et al.

(10) Patent No.: US 11,233,784 B2
(45) Date of Patent: Jan. 25, 2022

(54) SYSTEMS AND METHODS FOR MANAGING ACCESS TO SHARED NETWORK RESOURCES

(71) Applicant: BlackBerry Limited, Waterloo (CA)

(72) Inventors: Rajeev Ragunathan Nair, Slough (GB); Seung Sub Jung, London (GB); Johnathan George White, St. Albans (GB)

(73) Assignee: BlackBerry Limited, Waterloo (CA)

( * ) Notice: Subject to any disclaimer, the term of this patent is extended or adjusted under 35 U.S.C. 154(b) by 296 days.

(21) Appl. No.: 16/403,979

(22) Filed: May 6, 2019

(65) Prior Publication Data
US 2020/0358754 A1 Nov. 12, 2020

(51) Int. Cl.
| | |
|---|---|
| *H04L 29/06* | (2006.01) |
| *H04W 4/80* | (2018.01) |
| *H04L 29/08* | (2006.01) |
| *H04W 12/08* | (2021.01) |
| *H04W 12/47* | (2021.01) |

(52) U.S. Cl.
CPC .......... *H04L 63/083* (2013.01); *H04L 63/102* (2013.01); *H04L 67/146* (2013.01); *H04W 4/80* (2018.02); *H04W 12/08* (2013.01); *H04W 12/47* (2021.01)

(58) Field of Classification Search
CPC ..... H04L 63/083; H04L 63/08; H04L 63/102; H04L 67/146; H04W 4/80; H04W 12/47; H04W 12/08; G06F 21/31; G06F 21/45
See application file for complete search history.

(56) References Cited

U.S. PATENT DOCUMENTS

| | | | | |
|---|---|---|---|---|
| 7,466,810 B1 * | 12/2008 | Quon | ................ | H04M 3/42229 379/201.01 |
| 8,078,688 B2 * | 12/2011 | Ansari | .................. | H04L 67/141 709/217 |
| 8,423,058 B2 * | 4/2013 | Mathias | .............. | H04L 65/1069 455/466 |
| 8,725,880 B2 * | 5/2014 | Santamaria | ......... | H04L 65/1069 709/227 |
| 9,288,059 B2 * | 3/2016 | Nix | ......................... | G06F 21/35 |
| 9,438,499 B2 * | 9/2016 | Cole | ....................... | H04L 41/12 |

(Continued)

FOREIGN PATENT DOCUMENTS

EP  3451144 A1  6/2019

OTHER PUBLICATIONS

EPO: Extended European Search Report relating to EP application No. 20164291.5, dated Sep. 14, 2020.
EP Office Action, Application No. 20164291.5 dated Jun. 8, 2021.

*Primary Examiner* — Hosuk Song
(74) *Attorney, Agent, or Firm* — Rowand LLP

(57) ABSTRACT

A method for managing access to a shared endpoint of a network is disclosed. The method includes: receiving a user request to access a service associated with the shared endpoint; verifying that a user associated with the user request is authorized to access the service; in response to verifying that the user is authorized to access the service, obtaining a unique session identifier (USID) associated with the user request; receiving, via input from a device associated with the user, an access code; in response to determining that the inputted access code matches the USID, granting access to the service for the user.

18 Claims, 6 Drawing Sheets

(56) References Cited

U.S. PATENT DOCUMENTS

| | | | |
|---|---|---|---|
| 9,578,007 B2* | 2/2017 | Martin | H04L 63/0272 |
| 10,075,596 B2* | 9/2018 | Chakraborty | G06Q 50/32 |
| 2013/0179961 A1 | 7/2013 | Abe | |
| 2015/0205549 A1 | 7/2015 | Miyata | |

* cited by examiner

SYSTEMS AND METHODS FOR MANAGING ACCESS TO SHARED NETWORK RESOURCES

TECHNICAL FIELD

The present disclosure relates to network resource management and, in particular, to systems and methods for managing access to shared resources of a network.

BACKGROUND

In a networked environment, service endpoints may be shared among different users. A service endpoint may, for example, correspond to shared hardware, such as a multi-function printer, a display device, a speaker system, or a modem. More generally, a service endpoint may be an Internet-of-Things (IoT) device that is accessible to multiple authorized users.

A shared endpoint may represent a security vulnerability. In particular, a shared endpoint may be exposed to unauthorized access. For example, an attacker may gain access to a shared network device and use it to perform unauthorized tasks. As another example, user and/or session data associated with a service request to a shared endpoint may be vulnerable to access by unauthorized parties.

It would be desirable to provide a solution for managing shared network resources that preserves network security and privacy of user and session data.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
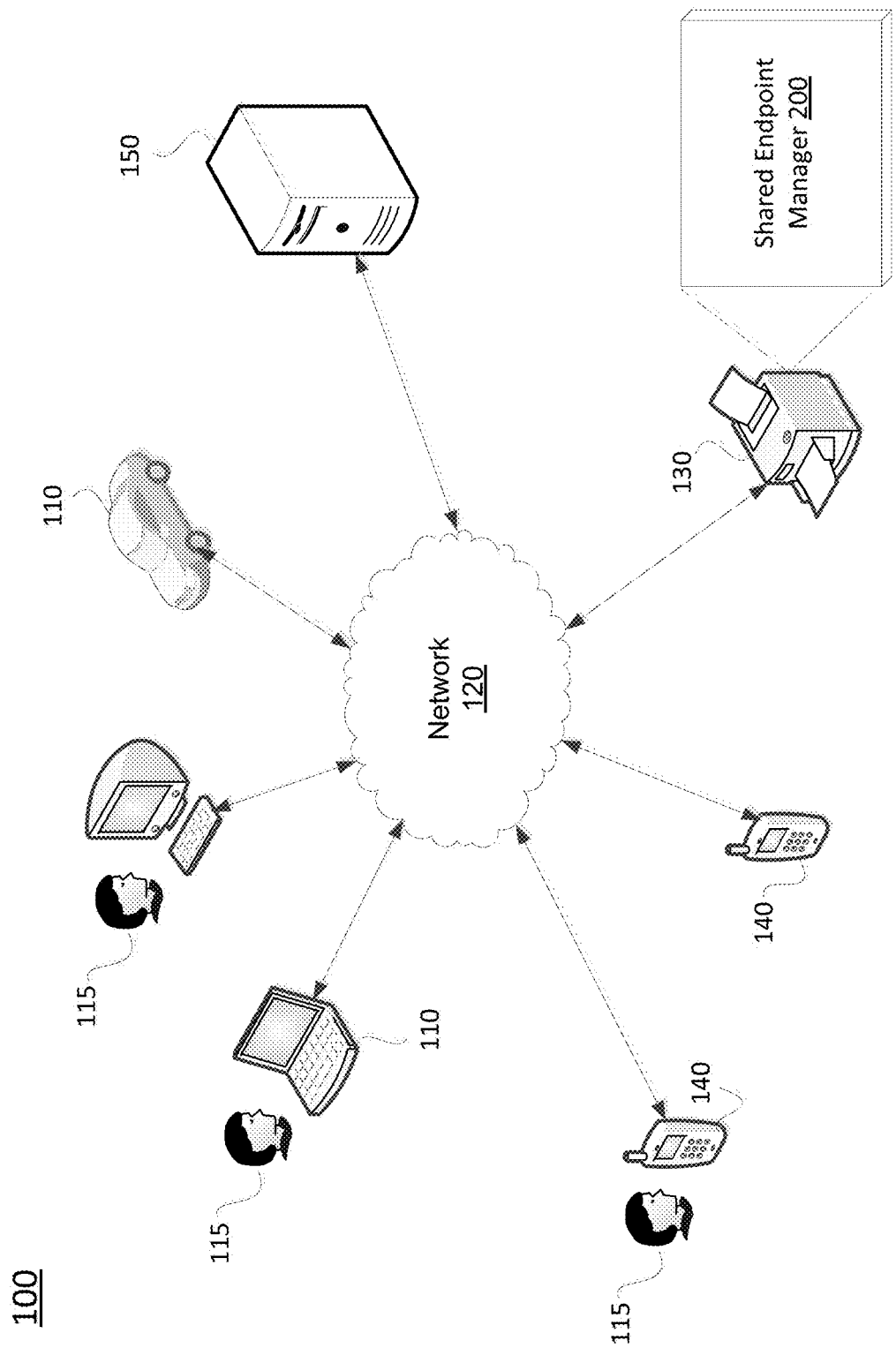
FIG. 1 is a schematic diagram illustrating an operating environment of an example embodiment.

In an aspect, the present disclosure describes a method for managing access to a shared endpoint of a network. The shared endpoint may, in some embodiments, be an Internet-of-Things (IoT) device that is accessible to one or more authorized users. The method includes: receiving a user request to access a service associated with the shared endpoint; verifying that a user associated with the user request is authorized to access the service; in response to verifying that the user is authorized to access the service, obtaining a unique session identifier (USID) associated with the user request; receiving, via input from a device associated with the user, an access code; in response to determining that the inputted access code matches the USID, granting access to the service for the user.

In some implementations, verifying that the user associated with the user request is authorized to access the service may comprise: transmitting, to a remote server, a request to verify that the user is authorized to access the service; and receiving, from the remote server, confirmation that the user is authorized to access the service.

In some implementations, obtaining the USID associated with the user request may comprise receiving, from the remote server, the USID.

In some implementations, the method may further comprise encrypting data associated with the user request using the obtained USID.

In some implementations, the method may further comprise: generating a user session item associated with the user request; and adding the user session item to a database containing active sessions data.

In some implementations, the service may comprise a task performed at the shared endpoint.

In some implementations, granting access to the service may comprise transmitting an instruction to the shared endpoint to complete the task.

In some implementations, the user request may include data associated with the task.

In some implementations, the access code may be received, by short-range communication, from the device associated with the user.

In some implementations, the short-range communication may comprise NFC or Bluetooth communication.

In another aspect, the present disclosure describes a computing system. The computing system may, for example, implement a server for managing access to one or more shared endpoints, such as a network resource or device that is accessible to authorized users. The computing system includes memory and a processor coupled to the memory. The processor is configured to: receive a user request to access a service associated with the shared endpoint; verify that a user associated with the user request is authorized to access the service; in response to verifying that the user is authorized to access the service, obtain a unique session identifier (USID) associated with the user request; receive, via input from a device associated with the user, an access code; in response to determining that the inputted access code matches the USID, grant access to the service for the user.

Other example embodiments of the present disclosure will be apparent to those of ordinary skill in the art from a review of the following detailed descriptions in conjunction with the drawings.

In the present application, the term "service request" is intended to encompass requests for various different types of services, tasks, or jobs to be processed or performed by a shared network endpoint. A service request may originate from a user terminal and contain, at least, data that is required for the service (or task, job, etc.) to be processed and identifying information for the requesting user. For example, a service request to a shared network device, such as a multi-function printer, display monitor, speakers, appliance, etc., may include file data for files that are requested to be processed using the device.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present disclosure relates to shared resource management. A computer network may include one or more shared resources, such as computer programs, data, storage devices, and hardware (e.g. printer, speakers, modem, etc.). The shared resources may represent service endpoints of the network. Users may transmit various requests from their respective terminals to a shared service endpoint. For example, user requests to process jobs requiring the use of a shared IoT device may be transmitted to a network endpoint associated with the IoT device.

Endpoint security may be particularly challenging for shared service endpoints. Specifically, a shared endpoint may be vulnerable to unauthorized access. For example, an attacker may gain access to a shared network device and use it to perform various unauthorized tasks. Such attacks can lead to undesired consumption of limited network resources and delays in processing valid service requests from authorized users. A shared endpoint may also expose user and/or session data to unauthorized access. An attacker may, for example, access confidential document data or private personal information associated with service requests from multiple different users.

Service requests to a shared endpoint are generally queued until the endpoint becomes available to process the requests. As the number and types of pending requests at any point in time may vary, a user may not be able to control precisely when their requested service gets processed. In cases where a shared endpoint generates an output (e.g. printed hard copy, visual display information, etc.), the user may need to be physically present at the endpoint, or shared device, when the requested service is processed, to ensure privacy of user and/or session data.

Systems and methods are provided for managing shared endpoints of a network. Specifically, the present disclosure describes a shared endpoint manager, or endpoints hub, for monitoring and managing shared resources of a network. The shared endpoint manager may, in some embodiments, be a hub for managing devices (e.g. Internet-of-Things devices) that are shared among users of a network. In particular, the shared endpoint manager may be used for controlling access to services (or jobs, tasks, etc.) that are provided by shared devices. A shared endpoint manager may manage access to a plurality of shared devices. For example, the shared endpoint manager may be a centralized hub for controlling access to multiple shared devices in a network. Alternatively, each of a plurality of shared devices may be associated with a respective shared endpoint manager. Each shared endpoint manager may manage operations, service requests, user sessions, etc., for a respective device.

The disclosed shared endpoint manager (SEM) establishes unique mappings between service requests and the users making the requests, and uses the unique mappings to securely manage access to shared endpoints. When a service request for a shared device is received from a user, a unique session for the device is formed at the SEM, based on the service request. In order for the session to be processed by the SEM, the requesting user must be validated as an authorized user of the requested service. Once the user is validated, a unique session identifier (USID) associated with the service request is obtained at the SEM. The USID is also provided to the requesting user. In this way, the USID represents a unique link between the service request and the requesting user. Specifically, the USID can be used as an authentication credential to ensure that only the requesting user can access and control the processing of the service request at the shared device. When the SEM receives a request to access a session, the SEM will compare user inputted information (e.g. inputted code) to the USID and if there is a match, the SEM will grant access to and control of the session to the user.

The SEM may be integrated into, or operate in conjunction with, a unified endpoint management (UEM) server that connects, monitors, and manages devices. A UEM server may be configured to perform, for example, device registration and provisioning, communication with connected devices, management of device access rights, and software deployment. The SEM may be implemented by one or more computing devices, such as a UEM server, which centrally administer multiple shared endpoints, or as a computer program which may be run at each of a plurality of shared endpoints.

Reference is first made to FIG. 1, which is a schematic diagram of an exemplary operating environment 100 in accordance with embodiments of the present disclosure. FIG. 1 illustrates an exemplary system for managing user requests to access one or more shared endpoints 130 of a network 120.

FIG. 1 shows a plurality of user terminals 110 associated with requesting users 115. Requesting users 115 may generate service requests (e.g. print jobs, media playback requests, etc.) on their respective user terminals 110 and transmit the requests to the shared endpoint 130. The user terminals 110 may be computer systems. For example, a user terminal 110 may be a desktop computer, a laptop, a tablet, a personal digital assistant, a portable navigation device, a smartphone, a wearable device (e.g., a smart watch, a wearable activity monitor, wearable smart jewelry, and glasses and other optical devices that include head-mounted displays), an embedded computing device (e.g., in communication with a smart textile or electronic fabric), or any other type of computing device that is configured to store and transmit data and execute software instructions. A user terminal 110 may include a smart card, chip card, integrated circuit card (ICC), and/or other card having an embedded integrated circuit. In some embodiments, a user terminal 110 may be a device or machine that the user requests to be serviced at the shared endpoint 130. A requesting user 115 may request for their user terminal 110 to be served at the shared endpoint 130 by generating the service request using the user terminal 110. For example, a driver of an electric vehicle may request electric charging services from a public electric vehicle (EV) charging point. The vehicle (i.e. user terminal 110) itself may be the source of the service request to the EV charging point.

A plurality of mobile devices 140 are also shown in FIG. 1. The mobile devices 140 are electronic devices. In an example embodiment, the mobile device 140 may be a mobile communication device. The mobile communication device may be configured for two-way communication, having data and optionally voice communication capabilities, and the capability to communicate with other computer systems, e.g. via the Internet. In other embodiments, the mobile device 140 may take other forms, such as laptops, tablets, wearable devices, or any other electronic device configured for connection over wireless networks.

The mobile devices 140 can be used to authenticate users to a shared endpoint manager 200. In at least some embodiments, a requesting user 115 may be associated with both a terminal 110 and a mobile device 140. The mobile device 140 may represent a device that is distinct from the terminal 110. The requesting user 115 may use their respective mobile device 140 to authenticate themselves to a shared endpoint manager 200 in order to access their requested service at a shared endpoint 130. In particular, a service request to a shared endpoint 130 that originates from a requesting user's terminal 110 may be accessed and/or controlled when the requesting user 115 authenticates to the shared endpoint manager 200 using their mobile device 140.

A requesting user's mobile device 140 may also be used to request services for a shared endpoint 130. That is, a requesting user may use their respective mobile device 140 for making a service request to a shared endpoint 130 and for authenticating to access the requested service at the shared endpoint 130.

In some embodiments, a mobile device 140 may not be associated with any of the requesting users 115. In particular, a mobile device 140 that does not belong to a requesting user 115 may be used to access and/or control a service request at a shared endpoint 130. For example, a requesting user 115 may request a service at the shared endpoint 130 and designate an authorized entity (e.g. an individual different from the requesting user 115) to access the requested service. The designated individual may use their own mobile device 140 to authenticate to the shared endpoint manager 200 and gain access to the service request. For example, the designated individual may receive, at their mobile device 140, the authentication credentials required for accessing the service request at the shared endpoint 130.

The mobile device 140 includes a processor, which operates under stored program control and executes software modules stored in memory (e.g. flash memory). The software modules may include operating system software and one or more applications or modules such as, for example, a service requests manager (SRM) application. The SRM application may, for example, be a web application (e.g. single-page application, or SPA) or a mobile application. The SRM application may be used to make service requests to a shared endpoint 130, monitor past and pending requests made by a requesting user 115 to service endpoints of a network, request access to a pending (i.e. queued) service at a shared endpoint 130, and authenticate the requesting user 115 to a shared endpoint 130 for accessing a requested service.

In some embodiments, the mobile device 140 may include a short-range communication subsystem. The short-range communication subsystem is an additional optional component which provides for communication between the mobile device 140 and different systems or devices, which need not necessarily be similar devices. For example, the short-range communication subsystem may include an infrared device and associated circuits and components, a wireless bus protocol compliant communication mechanism such as a Bluetooth® communication module to provide for communication with similarly-enabled systems and devices, and/or a near-field communication (NFC) interface.

The network 120 is a computer network. The network 120 allows computer systems in communication therewith to communicate. For example, as illustrated, the network 120 may allow the user terminals 110 to communicate with the shared endpoint manager 200, and the UEM server 150 to communicate with both the mobile devices 140 and the shared endpoint manager 200.

The shared endpoint 130 is a network node, and is accessible via the network 120. The shared endpoint 130 may be hardware, such as an IoT-compatible device (e.g. a printer, a scanner, a display monitor, etc.), which can be remotely accessed by one or more authorized users. In particular, the shared endpoint 130 may be configured to process service requests from multiple different users. In some embodiments, the shared endpoint 130 may be a shared utility or service station. For example, the shared endpoint 130 may be an electric vehicle (EV) charging station which can service various different types of vehicles.

The SEM 200 is implemented by a computer system. In at least some embodiments, the shared endpoint 130 may have its own SEM 200. In particular, a computer system associated with the shared endpoint 130 may implement an SEM 200 for managing service requests that are directed only to the shared endpoint 130. The computer system may, for example, be a computing device (or processing unit, etc.) which controls operation of the shared endpoint 130. The SEM may be run at the shared endpoint 130 to enable, for example, processing service requests, authenticating requesting users, and managing user sessions.

In some embodiments, the SEM 200 may be implemented by a centralized computer system which manages multiple different endpoints. For example, a device management server that administers a plurality of connected devices may implement an SEM 200 for managing those devices that are shared among multiple different users. A backend server, such as UEM server 150 of FIG. 1, which is connected to a plurality of shared endpoints 130 may implement the SEM 200. The SEM 200 may, for example, be integrated with the UEM server 150 as a device management backend. A UEM server implementing the SEM 200 may be deployed "on-premise" so as to be in direct network contact with shared resources/endpoints, or as a cloud-deployed server using on-premise connectors or connectivity nodes.

Figure 2A:
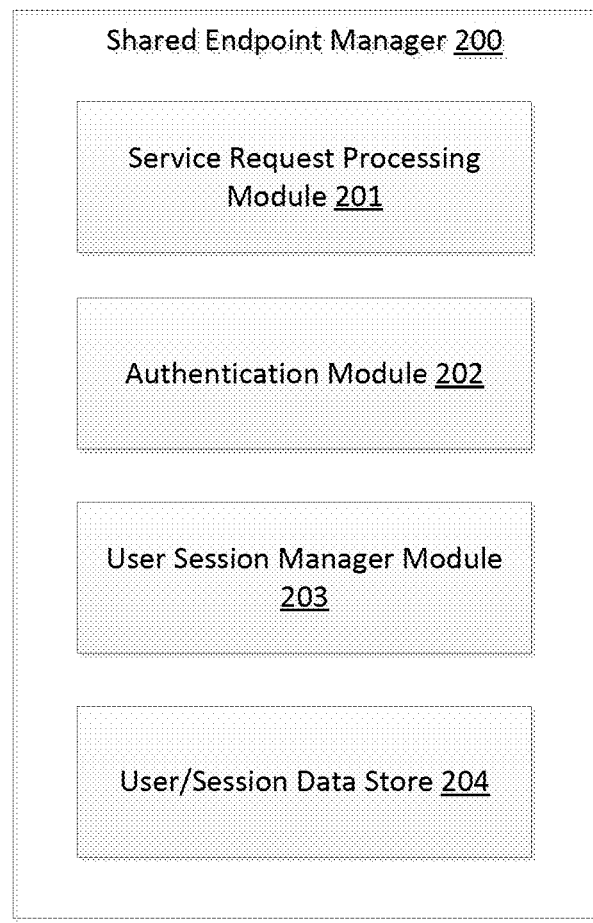
FIG. 2A is a block diagram illustrating component modules of a shared endpoint manager, in accordance with an example embodiment.

FIG. 2A illustrates example component modules of an SEM 200. The SEM 200 may handle various functions including, among others, service request processing, user authentication, sessions management, user/session data maintenance, and device management policy enforcement.

The service request processing module 201 receives and processes service requests from different users. The service request processing module 201 may be configured to check whether received service requests are properly formatted and contain sufficient data for the service requests to be processed by the shared endpoint 130. Upon receiving a service request, the service request processing module 201 may generate a unique user session based on, at least, the service request. The service request processing module 201 may then determine a priority of the generated user session and assign a position in a user session queue for the shared endpoint 130.

The authentication module 202 controls access to the shared endpoint 130. The SEM 200 is configured to prevent unauthorized access of pending service requests and their associated data at the shared endpoint 130. In particular, the SEM 200 restricts access to and/or control of pending service requests. The authentication module 202 ensures that a pending service request at the shared endpoint 130 is accessible only to the user who issued the request. The authentication procedure of SEM 200 will be described in greater detail below with reference to FIGS. 2B, 3 and 4.

The user session manager module 203 manages user sessions at the shared endpoint 130. The user session manager module 203 may implement a user session queue that includes all of the active user sessions corresponding to pending service requests. For example, the user session manager module 203 may add and delete user sessions, change user session data, and re-order user sessions, for example, based on changing priorities of requested services. The user session manager 203 may also be configured to encrypt data associated with the user sessions. In some embodiments, the user session manager 203 may generate data containers corresponding to the active user sessions and encrypt the data containers to protect the data associated with the user sessions. The user session manager 203 may delete a data container (and the associated user session data) once the corresponding requested service is completed or if one or more predetermined conditions are met (e.g. session time-out policy).

The user/session data store 204 stores data associated with past and pending service requests that are directed to the shared endpoint 130. The data associated with a service request may include, without limitation, file data (e.g. print document data, audio/video data, etc.), requesting user information (e.g. user name, device identifier, etc.), and endpoint identifier data (e.g. device IP address). The user/session data store 204 may store historical data, such as date received and date processed or cancelled, for past service requests received by the shared endpoint 130.

Figure 2B:
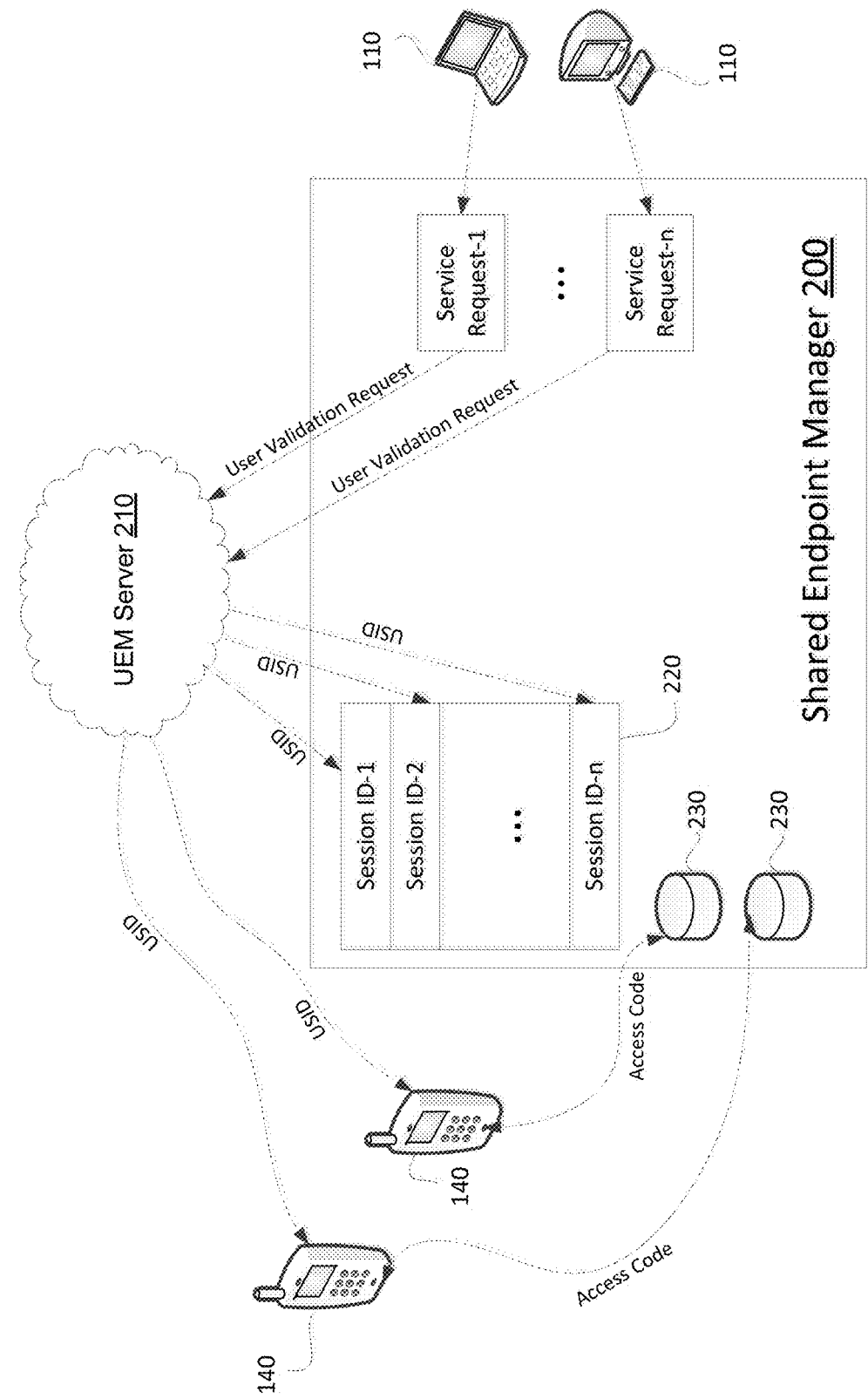
FIG. 2B is a schematic diagram of a system for processing service requests to a shared endpoint, in accordance with an example embodiment.
Figure 3:
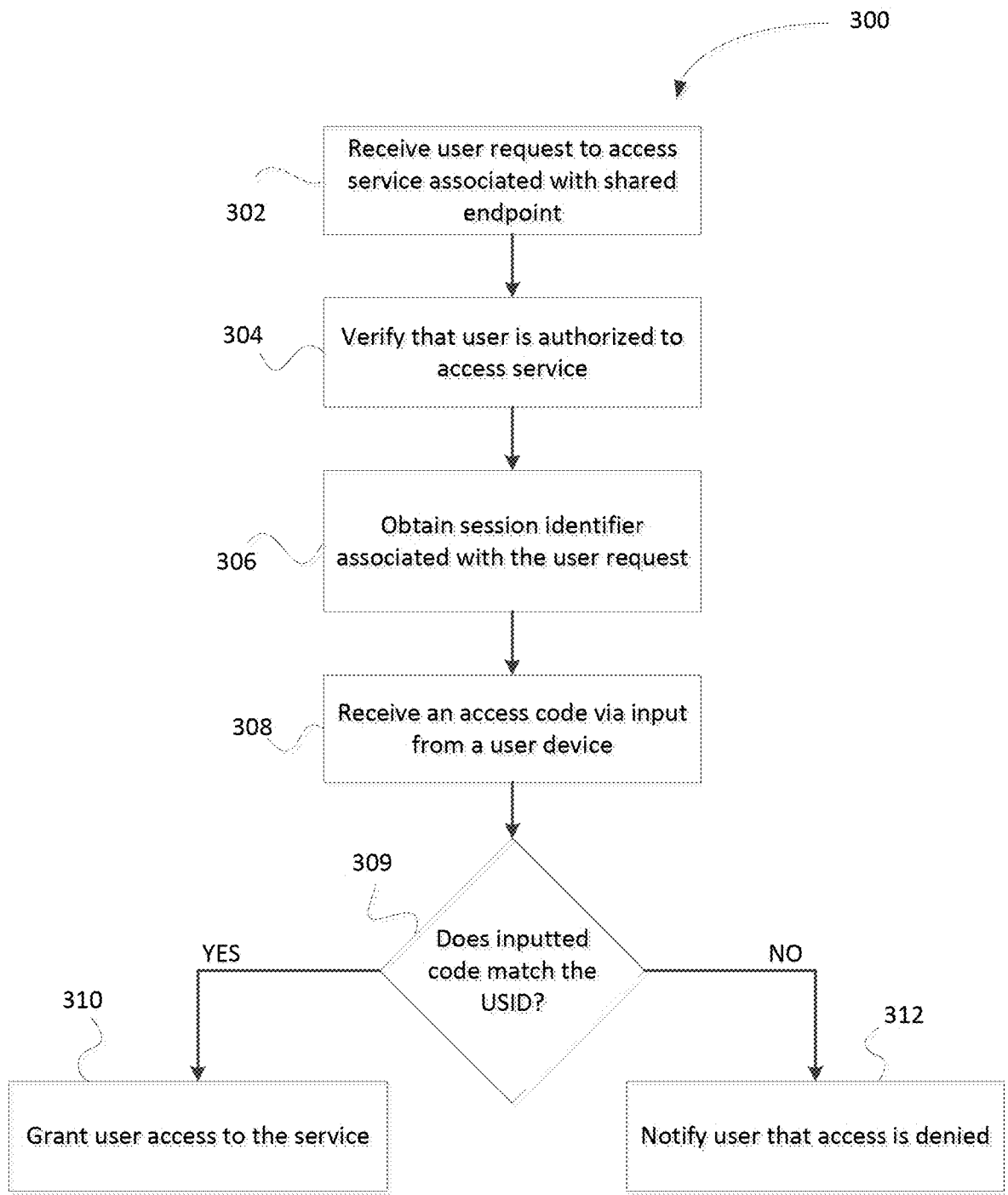
FIG. 3 shows, in flowchart form, a method for managing service requests to a shared endpoint of a network, in accordance with an example embodiment.

Reference is made to FIG. 2B, which is a schematic diagram of an example system for processing service requests to a shared endpoint, such as a shared IoT device, of a network. As shown in FIG. 2B, the SEM 200 may receive service requests that are directed to a shared endpoint from a plurality of user terminals 110. FIG. 3 shows, in flowchart form, an example method 300 for managing service requests to a shared endpoint of a network. The method 300 is performed by a computing system. Specifically, the method 300 may be performed by a server implementing a network endpoint manager, such as the SEM 200 of FIGS. 2A and 2B. For example, a centralized hub that is connected to a plurality of shared endpoints of a network may implement the method 300 in processing service requests directed to a shared endpoint. In some embodiments, the method 300 may be implemented by a controller associated with a single shared endpoint. For example, a processing unit of a shared network device may perform the method 300 in managing only the service requests intended for that device.

In operation 302, the SEM receives a user request to access a service associated with the shared endpoint. The shared endpoint may, for example, be a shared network device (e.g. a multi-function printer) or utility/service station (e.g. EV charging point). The user request to access the service, or service request, may comprise a request to share one or more resources (e.g. computing resources, such as data storage capacity, processing power, or bandwidth) that are available at the shared endpoint, or to use the shared endpoint for a specific purpose (e.g. charging an electric vehicle). For example, the user request may be a request to process a particular job or task using a shared network device (e.g. a multi-function printer). As another example, the user request may provide a file, such as an audio or video file, to be opened using a shared device (e.g. a display monitor, speakers, etc.). The user request may include, among others, file data, requesting user information, time of request, and a priority status for the requested service. The user request may be encrypted, to ensure that the data associated with the request (i.e. data relating to the requested service, user, etc.) is secure at the shared endpoint. That is, the SEM may receive an encrypted form of the user request data.

In response to receiving the service request, the SEM may generate a user session associated with the service request. The user session uniquely identifies the requesting user and the service that is requested by the user at the shared endpoint. Upon generating the user session, the SEM may assign a position to the user session in a service queue associated with the shared endpoint. In particular, the SEM may determine an order in which the user sessions will be processed at the shared endpoint. In some embodiments, the user session may be added to a database at the SEM which contains active session data. That is, the SEM may store session data for a plurality of active sessions corresponding to pending service requests at the shared endpoint.

In operation 304, the SEM verifies that a user associated with the user request is authorized to access the service. That is, the SEM checks to ensure that the user request is a valid request for a service from a user who is authorized to access such a service at the shared endpoint. If the user associated with the user request is not authorized to access the shared endpoint or the requested service, the SEM denies the user request. Additionally or alternatively, the SEM may verify that a device associated with the user is authorized to access the service. Specifically, the SEM may check whether a user terminal (e.g. electric vehicle to be charged) is authorized to receive services at the shared endpoint. For example, the SEM may determine if the user terminal is associated with a user that has been granted authorization to access the services provided at the shared endpoint, and is compatible with the shared endpoint.

In some embodiments, the SEM may request a remote server to verify that the requesting user is authorized to access the requested service. That is, the SEM may refer the verifying process to a server. The SEM may, for example, transmit a user validation request to the server. The server may be a backend UEM server 210, shown in FIG. 2B, which manages a plurality of endpoints (e.g. devices) of a network. The UEM server 210 may maintain authorized users data for each of its managed endpoints. For example, the UEM server 210 may store identities of users that are authorized to access one or more services at a shared endpoint and the level of authorization for those users. A level of authorization may, for example, indicate the specific services that a user is authorized to access, as well as any other limits on the authorization that is granted to a user. Upon verifying that a user associated with a user request is authorized to access the requested service, the backend server may send a confirmation message to the SEM.

In some embodiments, the SEM may be configured to check a local database to verify identities of authorized users for services at the shared endpoint. In particular, the SEM may itself perform verification of user identities and eligibility to access one or more requested services. The SEM may, for example, maintain a database of users that are authorized to access the shared endpoint as well as the services for which the users are so authorized.

Upon verification that the user is authorized to access the requested service, the SEM obtains a unique session identifier (USID) associated with the user request, in operation 306. In at least some embodiments, the USID is provided by the UEM server which performs validation of the requesting user. If the UEM server determines that a requesting user is authorized for the requested service, the UEM server may generate a USID for the user request. The USID serves as a unique link between the service request and the requesting user, and use of the USID in authentication by the SEM can ensure that only the user issuing the service request can access it at the shared endpoint. The UEM server distributes the USID to the shared endpoint and the requesting user. For example, the USID may be transmitted to both the shared endpoint and a user device associated with the requesting user.

In operation 308, the SEM receives, via input from a user device, an access code. In at least some embodiments, a user requesting access to and/or control of a user session (corresponding to a service request) at the shared endpoint is prompted to authenticate themselves to the shared endpoint. In particular, the user is required to demonstrate that they issued the service request for which access/control is sought.

The access code may be receive at the SEM through various different means. In some embodiments, a user may manually input an access code in response to a prompt for identity verification information from the SEM. For example, the user may request, using a service requests manager (SRM) application on their device, to access or control an active user session at the shared endpoint. The user may also manually input the request using an input interface of the shared endpoint, by identifying an active user session. When the user is prompted by the SEM to provide identity verification information for authentication, the user may input the access code for transmission to the SEM.

In some embodiments, the access code may be transmitted to the SEM by short-range communication from the requesting user's device. In order to enforce a requirement for physical proximity for accessing or controlling a user session at the shared endpoint, the SEM may require verification of identity through exchange of short-range communication, such as near-field or Bluetooth® communication. The transmission of identity verification information may be processed, for example, through an SRM application on the user device. The requesting user may use the SRM application in a vicinity of the shared endpoint to request access to a user session, and cause an access code to be transmitted to the SEM. The SRM application may, in some embodiments, automatically transmit a stored access code to the SEM. For example, the SRM application may detect, based on geolocation data for the user device, a physical proximity of the user device to the shared endpoint. The SRM application may identify an SEM associated with the shared endpoint and automatically transmit an access code to the identified SEM. The access code may, for example, be a code that is stored on the user device and which is associated with a specific shared endpoint and/or a service request for the shared endpoint.

In operation 309, the SEM determines whether the received access code matches the USID from the UEM server. If the access code does match the USID, the SEM grants the requesting user access to the user session, in operation 310. In some embodiments, the SEM may transmit an instruction to the shared endpoint to process and complete the requested service, such as a job, task, etc., corresponding to the user session. The authentication of the requesting user may thus serve as a trigger for the shared endpoint to perform the requested service. If the inputted access code does not match the USID stored in association with the user session at the shared endpoint, the SEM denies the access/control request. The SEM may, in some embodiments, notify the requesting user that the access/control request was denied. For example, the SEM may transmit a request denial message indicating that the inputted access code is incorrect for the requested user session.

Figure 4:
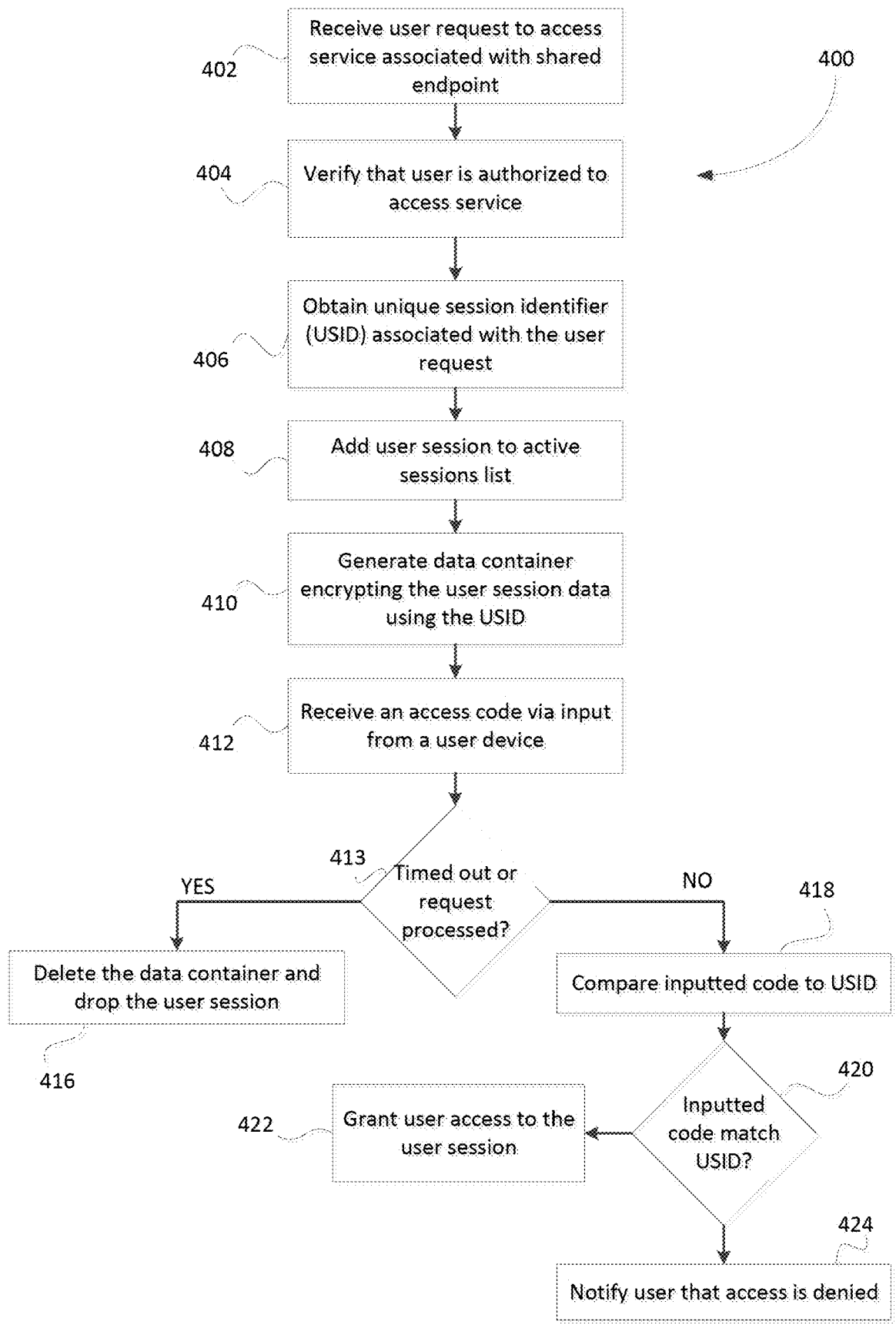
FIG. 4 shows, in flowchart form, another method for managing service requests to a shared endpoint of a network, in accordance with an example embodiment.

Reference is made to FIG. 4, which shows, in flowchart form, another example method 400 for managing services requests to a shared endpoint of a network. The method 400 is performed by a computing system. Specifically, the method 400 may be performed by a server implementing a network endpoint manager, such as the shared endpoint manager (SEM) 200 of FIGS. 2A and 2B. For example, a centralized hub that is connected to a plurality of shared endpoints of a network may implement the method 400 in processing service requests directed to a shared endpoint. In some embodiments, the method 400 may be implemented by a controller associated with a single shared endpoint. For example, a processing unit of a shared network device may perform the method 400 in managing only the service requests intended for that device.

Operations 402, 404 and 406 correspond to operations 302, 304 and 306 of method 300 in FIG. 3. The SEM receives a user request to access a service associated with the shared endpoint, in operation 402. In operation 404, the SEM verifies that the user is authorized to access the requested service. For example, the SEM may request a backend server, such as the UEM server 210 of FIG. 2B, to handle validation of the requesting user. In response to the verification, the SEM obtains a unique session identifier (USID) associated with the user request, in operation 406. The USID serves as a unique link between the service request and the requesting user.

In operation 408, the SEM generates a user session associated with the service request and adds the user session to an active session list at the SEM. The verification of the requesting user's identity in operation 406 validates the service request, and the SEM generates a user session corresponding to the valid service request. An active session list 220 is shown in FIG. 2B. The active session list 220 is a listing of active user sessions at the shared endpoint, and includes a plurality of user session entries.

In at least some embodiments, the SEM generates data containers corresponding to the active sessions at the shared endpoint. FIG. 2B shows a plurality of data containers 230 which are provided by the SEM 200. As in the example embodiment of FIG. 2B, the data containers 230 may be distinct from user session entries of the active session listing 220. The data containers hold session data such as, for example, file data, requesting user information, and service request details (e.g. time of request, priority status of requested service, etc.).

In operation 410, the SEM generates a data container which encrypts the session data for the user session. In particular, the SEM encrypts the data container for the user session using the USID associated with the service request. This ensures that the data container becomes accessible only to the user who possesses the USID for decrypting the session data. The data containers may be indexed such that when a request to access a particular user session is received, the SEM may identify the data container holding the data associated with the user session.

In operation 412, the SEM receives an access code, via input from a user device. A user requesting access to and/or control of the user session is prompted to authenticate themselves to the shared endpoint. The requesting user may, for example, be prompted to input an access code. The access code may be received at the SEM via numerous different means, such as manual user input or transmission by short-range communication from the user device.

The user sessions at the shared endpoint may not remain active indefinitely. The SEM may be configured to delete user sessions based on predefined conditions. In particular, the SEM may remove user sessions from a queue of active user sessions for the shared endpoint. In some embodiments, the SEM may delete an active user session if a time-out condition is satisfied. Each user session may be assigned a predefined time-out period or duration. If the SEM detects that an active user session has not been processed within the time-out period, the user session may be removed from the active session queue. For example, the SEM may delete the user session from a listing of active sessions and destroy any data containers associated with the user session.

In operation 413, the SEM determines whether the requested service has already been processed or whether a pre-defined condition for deleting an active session has been satisfied. If one or more such conditions are satisfied, the SEM removes the user session and destroys any data containers associated with the user session, in operation 416. Otherwise, if the requested user session is active (i.e. pending and not yet processed), the SEM proceeds to compare the inputted access code to the USID associated with the user session, in operation 418. The SEM determines whether the inputted code matches the USID in operation 420, and either grants the user access to the user session (operation 422) or notifies the user that access is denied (operation 424). In operation 422, the access code is used for decryption (i.e. symmetric-key encryption), enabling the shared endpoint to process the service corresponding to the user session.

Figure 5:
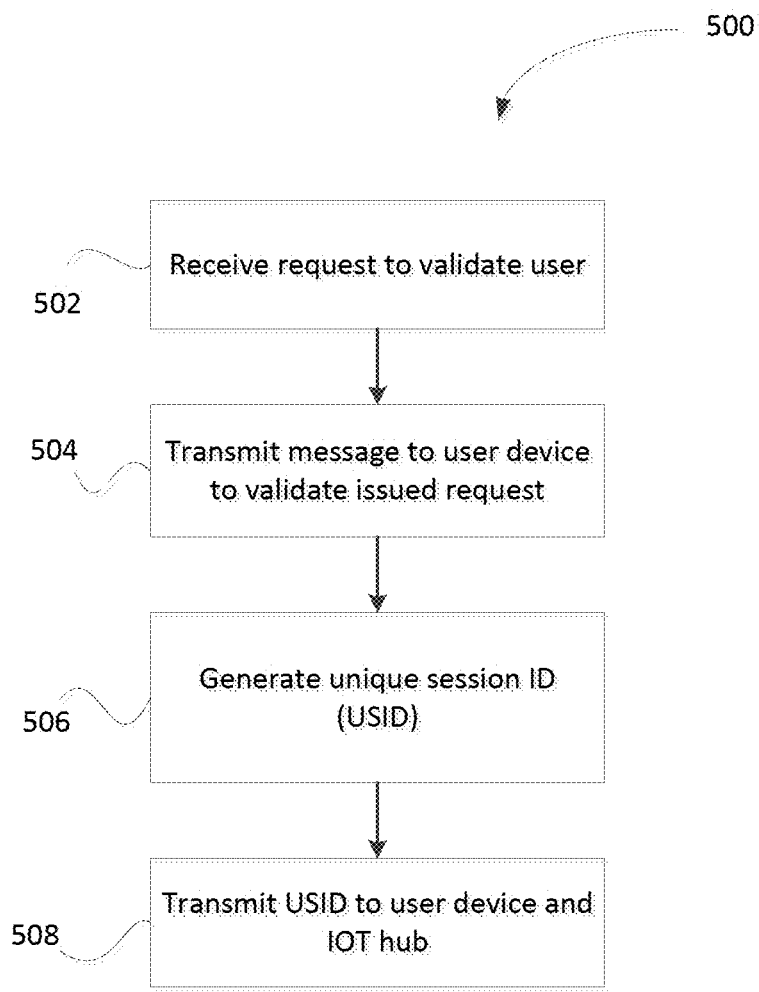
FIG. 5 shows, in flowchart form, a method for validating service requests to a shared endpoint of a network, in accordance with an example embodiment.

Reference is made to FIG. 5, which shows, in flowchart form, an example method 500 for validating service requests to a shared endpoint of a network. In at least some embodiments, the method 500 may be implemented by a server which administers a plurality of endpoints of a network. For example, a backend server, such as the UEM server 210 of FIG. 2B, may implement the method 500.

The server first receives a user validation request from an endpoints manager, such as SEM 200 of FIG. 2B, in operation 502. The endpoints manager may send a user validation request to the server for each service request received by the endpoints manager for a shared endpoint. The user validation request may specify, for example, a user identifier, a service requested by the user, and an endpoint identifier.

In response to receiving the user validation request, the server verifies whether the identified user is authorized to access the requested service. In some embodiments, the server may provide a prompt to a user device, such as a handheld device, associated with the user for verification that the user issued the service request. For example, the server may transmit a message to the user device to validate the issued request, in operation 504. The user may provide identity verification details, such as authentication credentials (e.g. biometric data, password, etc.), for submission to the server in response to the prompt. In cases where a user terminal is requested to be serviced at the shared endpoint, the validation message to the user may require the user to confirm details of the servicing session. For example, if a user's electric vehicle is requested to be charging at an EV charging point, the server may prompt the user to verify, via the user device, the session request and confirm details of the requested charging service (e.g. hours of charging). In some embodiments, the server may perform the user validation locally. In particular, the server may query a local database containing managed endpoints information and authorized user data for services available at each of the managed endpoints. For one or more shared endpoints, the database may indicate the identities of users that are authorized to access the shared endpoint as well as levels of authorization (i.e. services authorized, usage restrictions, etc.) for the authorized users.

Upon verifying that the user and/or user terminal is authorized to access the requested service, the server generates a unique session identifier (USID) associated with the service request to the shared endpoint, in operation 506. The USID is generated when the server determines that the service request is a valid request, i.e. request issued by an authorized user. In operation 508, the server distributes the USID to the shared endpoint or an endpoint manager for the shared endpoint. The server also distributes the USID to a device (e.g. handheld device) associated with the requesting user.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A processor-implemented method for managing access to a shared endpoint of a network, the method comprising:
    receiving a user request to access a service associated with the shared endpoint;
    verifying that a user associated with the user request is authorized to access the service, wherein the verifying includes:
        transmitting, to an endpoint management server, a request to verify that the user is authorized to access the service; and
        receiving, from the endpoint management server, confirmation that the user is authorized to access the service;
    in response to verifying that the user is authorized to access the service, obtaining, from the endpoint management server, a unique session identifier (USID) associated with the user request, wherein the USID is sent from the endpoint management server to a device associated with the user;
    receiving, via the device associated with the user, an access code;
    in response to determining that the access code matches the USID, granting access to the service for the user.

2. The method of claim 1, wherein obtaining the USID associated with the user request comprises receiving, from the endpoint management server, the USID.

3. The method of claim 1, further comprising encrypting data associated with the user request using the obtained USID.

4. The method of claim 1, further comprising:
    generating a user session item associated with the user request; and
    adding the user session item to a database containing active sessions data.

5. The method of claim 1, wherein the service comprises a task performed at the shared endpoint.

6. The method of claim 5, wherein granting access to the service comprises transmitting an instruction to the shared endpoint to complete the task.

7. The method of claim 5, wherein the user request includes data associated with the task.

8. The method of claim 1, wherein the access code is received, by short-range communication, from the device associated with the user.

9. The method of claim 8, wherein the short-range communication comprises NFC or Bluetooth communication.

10. A computing system comprising:
    memory;
    a processor coupled to the memory, the processor being configured to:
        receive a user request to access a service associated with a shared endpoint of a network;
        verify that a user associated with the user request is authorized to access the service, wherein the verifying includes:
            transmitting, to an endpoint management server, a request to verify that the user is authorized to access the service; and
            receiving, from the endpoint management server, confirmation that the user is authorized to access the service;
        in response to verifying that the user is authorized to access the service, obtain, from the endpoint management server, a unique session identifier (USID) associated with the user request, wherein the USID is sent from the endpoint management server to a device associated with the user;
        receive, via the device associated with the user, an access code;
        in response to determining that the inputted access code matches the USID, grant access to the service for the user.

11. The computing system of claim 10, wherein obtaining the USID associated with the user request comprises receiving, from the endpoint management server, the USID.

12. The computing system of claim 10, wherein the processor is further configured to encrypt data associated with the user request using the obtained USID.

13. The computing system of claim 10, wherein the processor is further configured to:
    generate a user session item associated with the user request; and
    add the user session item to a database containing active sessions data.

14. The computing system of claim 10, wherein the service comprises a task performed at the shared endpoint.

15. The computing system of claim 14, wherein granting access to the service comprises transmitting an instruction to the shared endpoint to complete the task.

16. The computing system of claim 14, wherein the user request includes data associated with the task.

17. The computing system of claim 10, wherein the access code is received, by short-range communication, from the device.

18. The computing system of claim 17, wherein the short-range communication comprises NFC or Bluetooth communication.

* * * * *